United States Patent [19]

Senese

[11] 3,992,804
[45] Nov. 23, 1976

[54] LOBSTER TRAP

[76] Inventor: Dominick J. Senese, 1522 Revere Circle, Schaumburg, Ill. 60172

[22] Filed: Feb. 11, 1975

[21] Appl. No.: 548,974

Related U.S. Application Data

[63] Continuation of Ser. No. 441,552, Feb. 14, 1974, abandoned.

[52] U.S. Cl. ................................. 43/100; 43/103
[51] Int. Cl.[2] .......................................... A01K 69/08
[58] Field of Search ................ 43/100, 65, 56, 57, 43/105, 1, 64, 66, 7, 6.5, 103, 4, 5, 13, 14, 17; 428/85, 89, 93, 95; 264/174, 215, 60, 62

[56] References Cited
UNITED STATES PATENTS

| | | | |
|---|---|---|---|
| 589,047 | 8/1897 | Thomas | 43/7 |
| 920,313 | 5/1909 | Franklin | 220/19 |
| 1,079,576 | 9/1913 | Noyes | 43/100 |
| 2,545,758 | 3/1951 | Best | 220/84 |
| 2,983,065 | 5/1961 | Ferguson | 43/42.22 |

OTHER PUBLICATIONS

World Fishing, Oct., 1969, pp. 34–35.

Primary Examiner—Louis G. Mancene
Assistant Examiner—Peter K. Skiff
Attorney, Agent, or Firm—Beall & Jeffery

[57] ABSTRACT

A lobster trap having a basic four sided container body, wherein the side walls are each constructed of a central panel having open mesh net material of widely spaced strands, which strands are composed of a plurality of tightly spaced individual strands, with the opposite ends of the individual strands being separated and arranged in a fan shape for lamination between close woven fiberglass cloth forming a quadrilateral framework, with the framework of adjacent walls being of one piece. The side walls further have hand holds in the framework.

The bottom of the lobster trap is formed of reinforced concrete having a securement bolt embedded therein that extends upwardly through the top, for clamping the side wall framework between the bottom and top. The top is held to the securement bolt by means of a cross pin that is soluble in water so as to release the top after a predetermined submerged time, for corresponding release of trapped lobsters therein when the trap is lost. For this purpose, the top is provided with floatation.

20 Claims, 6 Drawing Figures

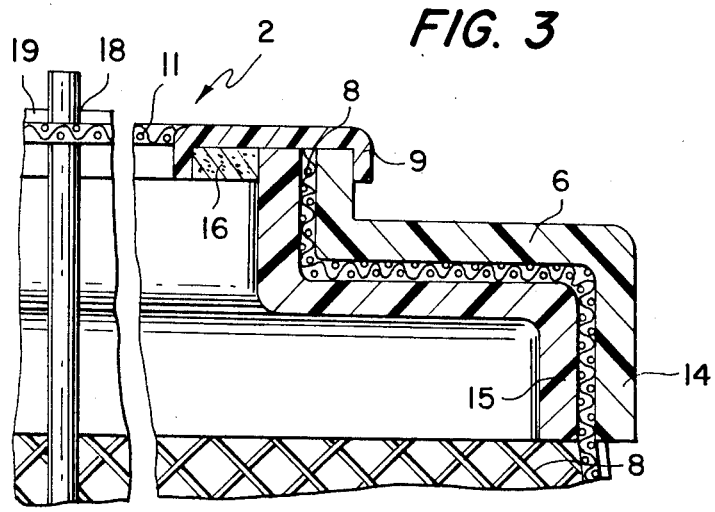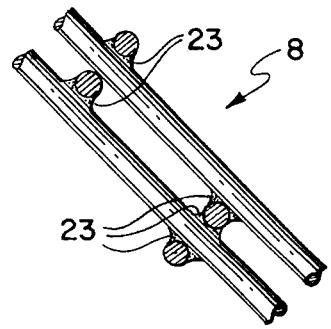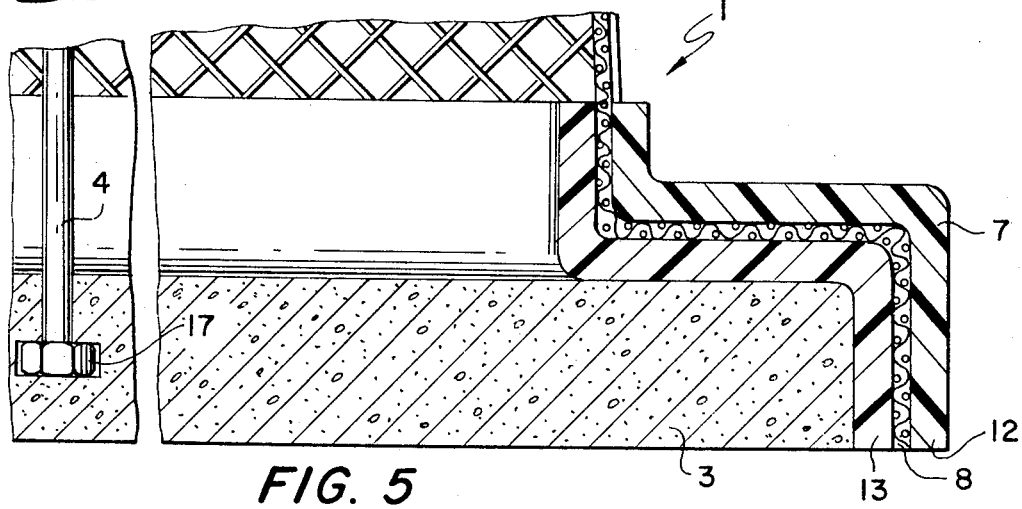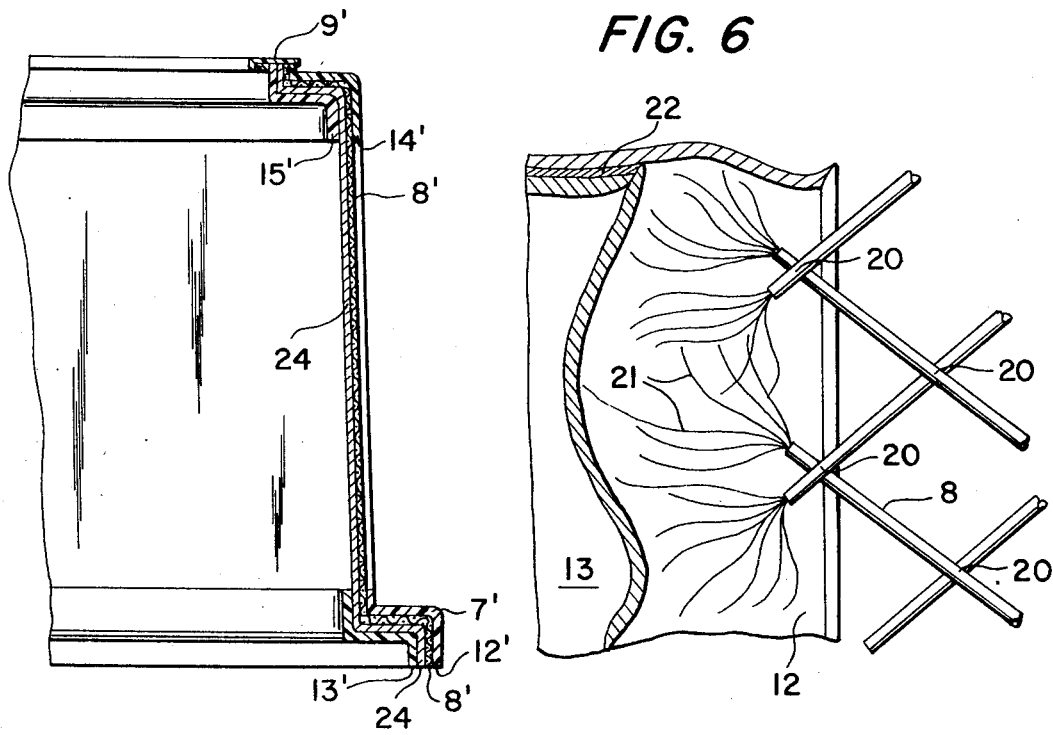

LOBSTER TRAP

This is a continuation of application Ser. No. 441,552, filed Feb. 14, 1974, now abandoned.

BACKGROUND OF THE INVENTION

With respect to present day lobster trapping practices, the generally used 45 foot boat, under accepted practices, has a 50 trap capacity with a weight factor of 75 pounds per trap. After the trap has been submerged it then has a weight factor of 125 pounds to 150 pounds, which accounts for a limited load capacity. The area capacity of each trap is 24 by 32 by 18 inches high, and the traps have a limitation of stacking four high.

The traps are generally constructed of wood and wire, and are prone to becoming fouled with marine bores so that they have a longevity from 8 to 18 months. These traps have become an annoyance factor to marine patrols and other enforcement agencies, because they have caused entrapment and waste of foodstuffs due to inability to retrieve the traps when marine bores have penetrated and destroyed the trap framework, or when they have become lost and the lobsters within the trap cannot escape until they die.

Lobster fishing or trapping boats are generally gone for 3 to 6 months, before they return to port. The boats come back to port when they have no more storage capacity for the lobsters that have been caught, with respect to either weight or volume. These boats are quite expensive and have crews from 6 to 8 people, so it is seen that if the storage room and weight of the lobster traps may be reduced, the boats may stay out for a longer period of time and take on more lobsters before they must make the long trip back to port.

SUMMARY OF THE INVENTION

It is an aobject of the present invention to produce a lobster trap that is lightweight, has a long life, small storage room requirements, low cost, and ability to release trapped lobsters when lost.

A lobster trap is basically a container that has four side walls constructed of wide mesh net material having the strands of its outer edge unraveled to arrange the plurality of individual strands for each main strand in a fan shape that is laminated between tightly woven glass cloth of a quadrilateral framework, with the framework of adjacent sides being integral. The mesh is arranged diagonally with respect to the frame, so that the resulting triangulation will increase the overall rigidity of the container. The bottom is cheaply constructed of reinforced concrete having an embedded securement bolt to clamp the side framework between the top and bottom. When the lobster boat is far from port and has taken on a large quantity of lobsters, to the point where storage capacity and storage weight become the limiting factor for continued fishing, the bottoms may be thrown away from retrieved traps and the remaining side and top structure is so constructed that it may be stacked to increase the capacity of a 45 foot boat from 50 traps to 350 traps according to the present invention. The tops are preferably constructed with the same open mesh net material laminated on a diagonal between inner and outer layers of glass cloth forming a rectangular framework, with the sides of the framework having a generally downwardly opening U-shape for receiving therein the upturned edge of the side walls and synthetic resin closed pore rigid foam material that will provide the top with a density considerably less than that of water. The top is held on by a soluble pin, so that if the trap is lost, the pin will dissolve after a predetermined period of time being submerged to release the top which will float away and in turn release any lobsters trapped therein.

For the present invention, the standard weight of 125 to 150 pounds has been reduced to 25 pounds. The lifetime of an average trap, 8 to 18 months, has been increased to a period in excess of 10 years. Further, the cost of one trap according to the present invention, is very little more than the annual replacement cost for conventional traps.

BRIEF DESCRIPTION OF THE DRAWING

Further objects, features and advantages of the present invention will become more clear from the following detailed description of a preferred embodiment, as shown in the attached drawing, wherein:

FIG. 3 is a cross sectional view taken on a vertical plane through one of the sides of the trap, with the center portion broken away to reduce the overall illustrated height;

FIG. 4 is a cross sectional view taken through the double woven mesh material of the walls;

FIG. 5 is a cross section through the container structure of the present invention used as a liquid tank or closed storage container; and FIG. 6 shows the means for laminating the mesh material with the material of the framework.

DETAILED DESCRIPTION OF THE INVENTION

Figure 1:
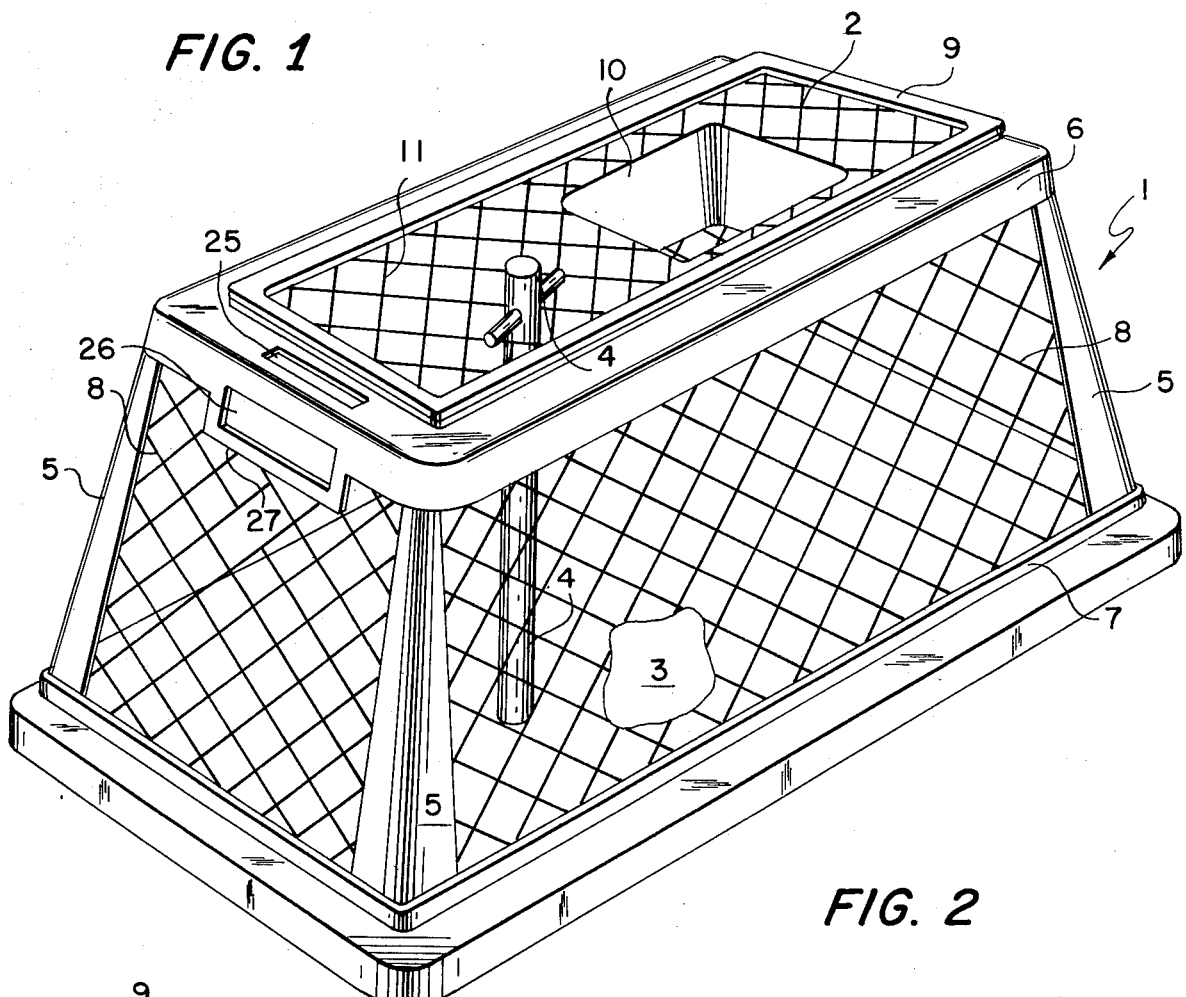
FIG. 1 is a perspective view of a lobster trap constructed according to the present invention.
Figure 2:
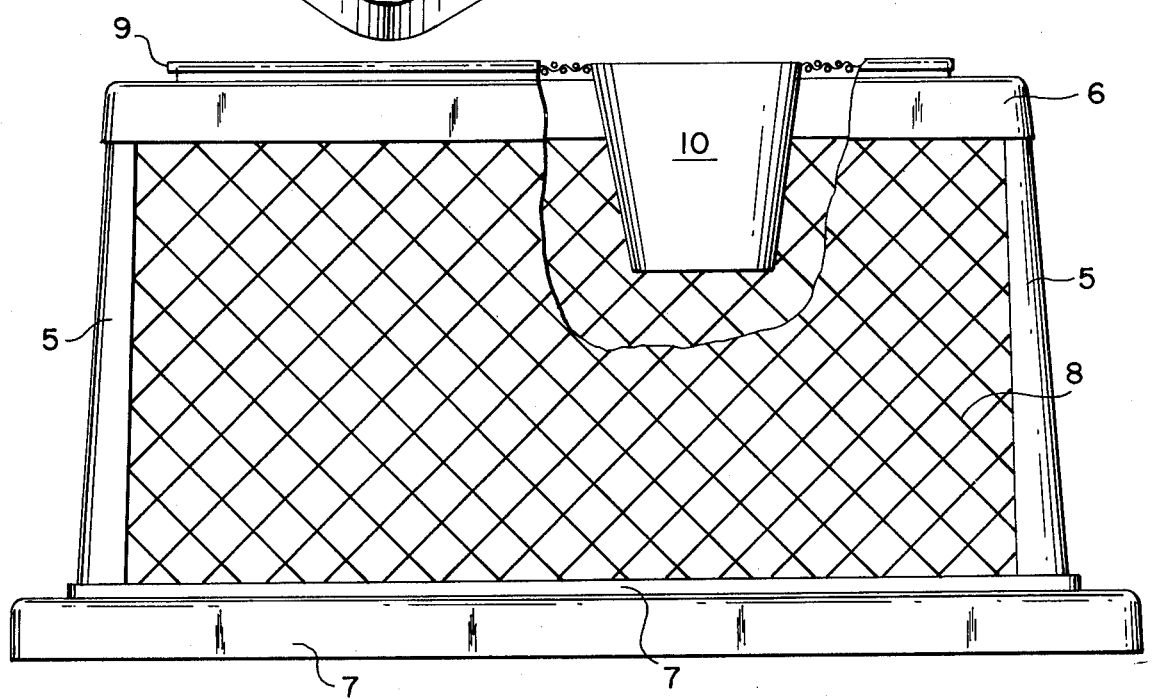
FIG. 2 is a side elevation view, with portions broken away, of the lobster trap according to FIG. 1.

As shown in the perspective view of FIG. 1, the lobster trap comprises a basic four sided framework 1, a top 2, a bottom 3, and securement means 4 for clamping the framework 1 between the top and bottom.

Each one of the sides forming the framework 1 has vertical frame members 5, an upper frame member 6, and a lower frame member 7, all of which are integrally connected together to form a quadrilateral frame. In horizontal cross section, each of the vertical frame members 5 would have an equal side right angle cross section, with a rounded corner. The cross sectional configuration of the upper frame member 6 and the lower frame member 7 is shown in FIG. 3, and will be described in more detail hereinafter. Each of the sides further has a central panel of an open mesh net material of double woven strands, with the holes in the net material being approximately 1 ¼ inch square. The strands of the net material 8 are preferably constructed of a plurality of individually closely packed, twisted or the like individual strands of fiberglass. As will be described in more detail later, the peripheral edge of the net material 8 is securely laminated, embedded or the like within the frame members 5, 6, 7, with the strands of the net material extending diagonally between adjacent frame members to form therewith traiangles of increasing area with adjacent strands, which triangulation provides for a particularly rigid structure. This basic four sided framework 1 has been found to easily support a 6,000 pound deflection, when the framework is constructed so as to have a length of 30 inches, a width of 24 inches, and a height of 18 inches. THe weigh of such a framework is less than 6 pounds, so that its capacity is approximately 1,000 times its weight. It is seen that the central panel of the net material 8 and the frame members 5, 6, 7 forming a peripheral rigid frame together define a planar wall.

The above described basic planar wall construction is substantially the same for the top 2, which top 2 has the quadrilateral rigid frame 9 that laminates or has embedded therein the open mesh net material 11. However, the top has a central portion of the net material removed to form a hole, and the strands of the adjacent hole bonded, laminated or otherwise rigidly secured to a funnel shaped member 10. The funnel shaped member 10 has a transverse cross section that decreases inwardly, so as to provide an entrance for the lobsters, but to generally prevent their exit from the trap container.

The laminated structure of the net material 8 and frame members 6, 7 is more clearly shown in FIG. 3, wherein it is seen that the lower frame member 7 comprises an outer layer of material, which is preferably 40 ounce tightly woven fiberglass cloth; the inner layer 13 is preferably also constructed of 40 ounce tightly woven fiberglass cloth. As shown, the net material 8 is laminated between the outer layer 12 and the inner layer 13, preferably with a suitable bonding resin therebetween. The bonding resin preferably is an isophthallic, slightly resilient polyester, although any of the known resins employed for bonding fiberglass may be used. The net material 8 may extend entirely between the outer and inner layers 12, 13 or only partially, so long as a secure and rigid engagement is obtained. As seen, the lower frame member 7 includes a lower vertically extending flange joined at its upper end with an inwardly and horizontally extending intermediate portion, which is in turn joined at its inner end with an upwardly extending flange.

As further shown in FIG. 3, the upper frame member 6 comprises outer and inner fiberglass cloth layers laminated with the net material 8, which lamination and basic construction is identical to that of the lower frame member 7, and also is identical to the laminated and material structure of the vertical frame member 5.

The cross section of the top frame member 9 is substantially the same around its entire periphery and has the shape of an inverted U, which receives within its channel the upwardly extending flange of the upper frame member 6, and has the remaining portion of its channel filled with a closed pore, rigid foam synthetic resin, such as, polystyrene. The frame member 9 is preferably also constructed of inner and outer 40 ounce fiberglass cloth bonding therebetween, with a bonding resin, the net material 11, although specific details are not shown in the drawing since they would be similar to those shown with respect to the upper and lower frame members 6, 7. However, with respect to the top frame member 9, it is seen that the outer layer would only extend from the outer flange across the web, because of the entrance of the net material 11 into the lamination.

The bottom 3 is constructed of a slab of reinforced concrete, which has embedded therein the terminal end 17 of a bolt securement member 4, which bolt extends upwardly within the spaced from the side walls of the basic container 1 to its upper end that extends through and beyond the net material 11 of the top 2. The upper end of the bolt 4 is provided with a cross hole 18 having therein a cross coupling pin 19, which pin 19 is preferably constructed of a water soluble material that will have a solubility time such that after a predetermined time of being submerged, the pin will release the cover 2 from the bolt 4. Usually, lobster traps are submerged for a maximum predetermined time before they are retrieved to gather in the caught lobsters. If for some reason, the trap cannot be found within that time or it becomes separated from its retrieval line, the trap is considered lost and heretofore lobsters therein have died and been wasted. With the present invention, the pin 19 will dissolve after this predetermined time when it is considered that the trap is lost, to uncouple the top 2. When the top 2 is uncoupled, actual tests have shown that it will be released from the basic container structure 1 so rapidly that it appears to be exploded off of the remaining structure due to the average density of the top being considerably less than that of water, because of the rigid foam 16. Considerable force is thus generated, when it is realized that the traps may be generally placed at a depth of 200 feet.

As shown in FIG. 4, the net material 8 and 11 is cut from indeterminate lengths of fiberglass strand mesh, that is double woven so as to provide cross strands, and the points at which these strands cross are bonded, for example with the use of resin 23. Preferably, the bonding 23 is provided in the stock cloth before it is cut to size and laminated with the frame members 5, 6, 7, 9. After lamination, the entire structure is preferably dipped in further resin, so as to coat all joints and further add to the rigidity of the structure, without closing the holes between the strands of the net material.

In FIG. 6, there is shown the specific form of lamination for the lower frame member 7, although this lamination would be identical for the other frame member 5, 6, 9. As shown, the net material has its strands bonded at 20 where they cross each other, so that the cut ends of the strands that are free and extend beyond the bonds 20 may be blown, brushed or the like so as to separate the individual small fiberglass strands that make up the composite strands of the net material 8. As shown, these individual strands 21 are thus formed in general flat fan shape and placed between the fiberglass cloth layers 12 and 13, with the bonding resin 22 further placed between the layers 12, 13. Thereafter, the entire structure is pressed tightly together within a mold and cured to form a rigid integral laminated bond between the net material and the frame members.

The basic frame structure of the present invention has further uses, other than as a lobster trap, as shown in FIG. 5 in cross section. The basic framework structure of FIG. 5 is substantially identical to that previously described and for this reason, like numerals have been used for like parts, except with the addition of primes to indicate a modification. In addition, an impermeable sheet material 24 has been added interiorly of the net material 8', to be coextensive therewith and thus bonded between the inner and outer layers 12', 13' of the lower frame member, and to be further bonded between the inner and outer layers 14', 15', as well as elsewhere around the framework. In addition, impermeable tops and bottoms may be provided so that the overall container may hold a liquid, such as gasoline for storage on boats, or the container may be provided with a totally removable top so as to form a storage container for boats or the like that may also serve the function of a seat.

In using the lobster trap of the present invention, it is contemplated that the basic framework 1 and top 2 will be sold along with a generous supply of securement members 4, 19. Many fisherman like to design their own entrances 10, which may be easily added by cutting the appropriate size hole within the net material 11 and bonding the funnel pipe 10 to it by any commercially available resin. Since the primary strength of the container structure is provided in the framework 1, this weakening of the top 2 is not of particular importance. The entrance pipe 10 may be constructed of polyvinylchloride or other easily obtainable material, which may be cut from stock lengths or the like.

Further, it is contemplated that the bottom slab 3 will be poured by the users, so that the bottom may be thrown away whenever storage becomes a problem onboard ship, while far from port. After throwing away the bottom 3 together with its securement bolt 4, it is seen that the remaining trap structure 1, 2 will readily stack due to the particular shape of the framework 1, which has its side walls sloping inwardly toward the top so that the framework 1 will nest with a similar framework 1, with the tops in place. Further, it is seen that the entrances 10 will nest together with such stacking. As bottoms are thrown away and the remaining trap structure nested, the boat may stay out for a longer period of time with the remaining intact traps, until the boat is filled with lobsters, since the stacked traps will take up a negligible amount of room. This is extremely important, since the primary limitation for the amount of time that a boat stays out and the number of lobsters caught has been the difficulty of storing the traps, which when stacked without nesting have considerably raised the center of gravity of the boat to where there is a danger of tipping together with the weight of the lobsters onboard. It is seen that with throwing away of the bottom slab 3, which forms the ballast and uprighting feature of the present invention, the remaining trap structure is a fraction of the total weight of former traps, and further with nesting of the stacked traps, the center of gravity of the stacked traps is considerably lower than that of previously stacked traps. In addition, there is an obvious space saving. After reaching shore, it is an easy and cheap matter to pour new bottoms for the next trip.

Further, the present invention includes the provision of a unique bait container and bait for trapping lobsters. According to the present invention, standard commercially available cans of sardines are procured. When the traps are placed in position, these sardine cans are pierced with an icepick or the like and readily attached to the interior of the trap structure, for example by being lashed to any of the net material 8, 11 or the securement means 4. It has been found that the lobster is primarily attracted and will enter the trap due to the smell of the bait, so that it is not necessary that the lobster actually be able to eat any of the bait. The bait of the present invention further has the advantage of being sealed until use, being extremely cheap, and being prepackaged so that there is no particular amount of labor involved on the part of the fisherman.

While a preferred embodiment of the present invention has been described in detail, along with a modification, further modifications, embodiments and variations are contemplated according to the broader aspects of the present invention, all as defined by the spirit and scope of the following claims.

What is claimed is:

1. A crustacean trap, comprising: a plurality of generally planar walls forming the interior of said crustacean trap therebetween; at least one of said walls being defined by a central panel and a continuous closed peripheral frame integrally connected with and extending outwardly from the edge periphery of said central panel; said central panel including an open mesh net material of woven strands with the interstices between said strands being substantially larger than the diameter of the strands; said peripheral frame having an inner layer of material, an outer layer of material, the peripheral edge portion of said panel between said inner and outer layers, and bonding means laminating said layers together with said peripheral edge portion of said panel therebetween; said peripheral frame comprising four straight portions serially interconnected to form a quadilateral frame having at least two straight portions parallel to each other; said panel being so constructed that its strands are woven in a rectilinear grind diagonally oriented with respect to said straight portions so that two adjacent edge portions will form with the adjacent strands extending therebetween a series of increasing area triangles for rigid interbracing; three further walls as defined with respect to said one wall and forming with said one wall the four sides of the container, with adjacent straight frame portions being of one piece construction with each other; further including top and bottom members forming all of the walls of the crustacean trap with said side walls; the lower straight portion of each of said frames including in one piece, a lower generally vertically extending flange, an intermediate portion extending inwardly from the upper portion of said lower flange, and an upper flange extending generally vertically upwardly from the innermost end of said intermediate portion; said bottom member including a reinforced concrete slab having its edge portion, around its entire periphery, fitting within the area of said lower flange and intermediate portion; an elongated rigid securement member embedded at one end within said slab, extending generally vertically upwardly between and spaced from said side walls, and extending outwardly through said top at its opposite end; and means coupled with said opposite end of said securement member for securing said top tightly against the upper periphery of said sides, said top including a central panel of open mesh net material of woven strands with the interstices between said strands being substantially larger than the diameter of said strands and a closed continuous periphery frame of a downwardly opening U-shape comprising inner and outer layers of fabric having the edge portion of said open mesh net material laminated between said inner and outer layers, and said cover when in its closed position having the upwardly extending flange of said side wall frame within the interior of the downwardly extending U-shape; the remaining portion of the interior of said downwardly opening U-shape being filled with a closed pore synthetic resin rigid from; said top central panel including a lobster entrance means comprising an inwardly converging funnel extending through said open mesh net material.

2. The crustacean trap of claim 1, wherein said coupled means includes a pin extending through said opposite end of said securement member immediately above and in contact with said top, and said pin being constructed of a water soluble material, so that after a predetermined period of being submerged, said pin will disintegrate and uncouple said top; and said top having an average density substantially less than that of water, so that it will open and float away from the remainder of said container when so uncoupled from the submerged container.

3. The crustacean trap of claim 2, wherein said top includes a substantial amount of synthetic resin closed pore rigid foam around its periphery.

4. A crustacean trap, comprising: four individual generally planar side walls, a top wall and a bottom forming the interior of said crustacean trap therebetween; at least some of said walls being defined by a central panel and a continuous closed peripheral frame integrally connected with and extending outwardly from the edge periphery of said central panel; said central panel including an open mesh net material of woven strands with the interstices between said strands being substantially larger than the strands for the free flow of water and too small for the passage of a grown crustacean; each of said peripheral frames having an inner layer of synthetic resin rigid material, an outer layer of synthetic resin rigid material, the peripheral edge portion of its associated panel between said inner and outer layers, and synthetic resin bonding means laminating said layers together with said peripheral edge portion of said panel therebetween; each of said peripheral frames further comprising four straight portions serially interconnected to form a quadilateral frame having at least two straight portions parallel to each other; each of said panels being so constructed that its strands are woven in a rectilinear grid diagonally oriented with respect to said straight portions so that two adjacent straight portions will form with the adjacent strands extending therebetween a series of increasing area triangles for rigid interbracing; and at least one of said walls having means, including an inwardly converging funnnel, for permitting entry of grown crustaceans within the crustaceann traps and preventing their exit.

5. The crustacean trap of claim 4, wherein the top straight portions of at least two opposed peripheral frames include recesses forming hand grip means.

6. The crustacean trap of claim 4, wherein said bottom is separable from said side and top walls; and the four side walls of the crustacean trap are each sloped inwardly toward the top so that the structure of the four side walls and the top may be stacked with identical structures in a nesting relationship with their tops closely adjacent each other.

7. The crustcean trap of claim 6, wherein said bottom is concrete slab having an edge portion; means for releasably joining said slab edge portion around its entire periphery with adjacent lower edges of said side walls.

8. The crustacean trap of claim 7, further including means cooperating with said side walls or releasably joining said top wall and said bottom normally rigidly together, and including a water soluble link means that will dissolve after a predetermined period of being submerged, to release at least said top wall and bottom to permit escape of crustacean trapped therein in the event that the crustacean trap is not recovered after said predetermined period; and floatation means structurally connected to said top to provide said top and its attached structure with an average density less than that of water so that the top wall will float away from said bottom when said water soluble link dissolves.

9. The crustacean trap of claim 4, wherein said bottom has an average density substantially greater than that of water and substantially greater than the average density of said side walls and top wall; further including means cooperating with said side walls for releasably joining said top wall and said bottom normally rigidly together, and including a water soluble link means that will dissolve after a predetermined period of being submerged, to release at least said top wall and bottom to permit escape of crustaceans trapped therein in the event that the crustacean trap is not recovered after said predetermined period; and floatation means structurally connected to said top to provide said top and its attached structure with an average density less than that of water so that the top wall will float away from said bottom when said water soluble link dissolves.

10. A crustacean trap, comprising: four individual generally planar side walls, a top wall and a bottom forming the interior of said crustacean trap therebetween; said side being defined by a central panel and a continuous closed peripheral frame integrally connected with and extending outwardly from the edge periphery of said central panel; said central panel including an open mesh net material of woven strands with the interstices between said strands being substantially larger than the diameter of the strands for the free flow of water and too small for the passage of a grown crustacean; each of said peripheral frames having an inner layer of synthetic resin rigid material, an outer layer of synthetic resin rigid material, the peripheral edge portions of its associated panel between said inner and outer layers, and synthetic resin bonding means laminating said layers together with said peripheral edge portion of said panel therebetween; each of said peripheral frames further comprising four straight portions serially interconnected to form a quadrilateral frame having at least two straight portions parallel to each other; and at least one of said walls having means, including an inwardly converging funnel, for permitting entry of grown crustacean within the crustacean trap and preventing their exit.

11. The crustacean trap of claim 10, wherein said bottom is separable from said side and top walls; and the four side walls of the crustacean trap are sloped inwardly toward the top so that the structure of the four side walls and the top may be stacked with identical structures in a nesting relationship with their tops closely adjacent each other.

12. The crustacean trap of claim 11, wherein said bottom is a concrete slab having an edge portion; means for releasably joining said slab edge portion around its entire periphery with adjacent lower edges of said side walls.

13. The crustacean trap of claim 12, further including means cooperating with said side walls for releasably joining said top wall and said bottom normally rigidly together, and including a water soluble link means that will dissolve after a predetermined period of being submerged, to release at least said top wall and bottom to permit escape of crustacean trapped therein in the event that the crustacean trap is not recovered after said predetermined period; and floatation means structurallly connected to said top to provide said top and its attached structure with an average density less than that of water so that the top wall will float away from said bottom when said water soluble link dissolves.

14. The crustacean trap of claim 10, wherein said bottom has an average density substantially greater than that of water and substantially greater than the average density of said side walls and top wall; further including means cooperating with said side walls for releasably joining said top wall and said bottom normally rigidly together, and including a water soluble link means that will dissolve after a predetermined period of being submerged, to release at least said top wall and bottom to permit escape of lobster trapped therein in the event that the crustacean trap is not recovered after said predetermined period; and floatation means structurally connected to said top to provide said top and its attached structure with an average density less than that of water so that the top wall will float away from said bottom when said water soluble link dissolves.

15. The crustacean trap having all of its side walls and its top wall each having a central panel and continuous closed peripheral frame as defined in claim 10.

16. The crustacean trap of claim 10, wherein said mesh net material comprises two woven layers with each strand bonded to its immediately adjacent cross strands.

17. A crustacean trap, comprising: side, top and bottom walls forming therebetween a crustacean trap; at least one of said side and top walls having means, including an inwardly converging funnel, for permitting entry of grown crustaceans within the crustacean trap and preventing their exit; the center of gravity of the crustacean trap being adjacent said bottom wall and said crustacean trap having an average density substantially more than that of water so that the crustacean trap will sink to an upright position when placed to trap crustaceans; at least one of said side and top walls having an average density substantially less than that of water; and soluble link means forming the only connection between said one wall and the remainder of said crustacean trap normally securely holding said one wall in its trap forming position and that will dissolve after a predetermined period of being submerged to release at least said one wall and permit the escape of crustaceans trapped therein in the event that the crustacean trap is not recovered after said predetermined period and freely permit said at least one wall to float away from the remaining structure of said crustacean trap.

18. A crustacean trap, comprising: four individual generally planar side walls, a top wall and a bottom wall forming the interior of said crustacean trap therebetween; at least one of said side and top walls having means for permitting entry of grown crustaceans within the crustacean trap and preventing their exit; said bottom wall being separable from said side and top walls; releasable connector means for selectively securing said bottom wall to said side and top walls; said four side walls of said crustacean trap being each sloped inwardly toward the top so that the structure of the four side walls and the top wall may be stacked with identical structures in a nesting relationship with their tops closely adjacent each other; said top and side walls, in the complete trap position, being parallel to each other; said bottom wall being of substantially greater density than said top and side walls.

19. The crustacean trap according to claim 18, wherein said bottom wall is a concrete slab having an edge portion; and said means for releasably securing the bottom wall to the remainder of said walls joining said slab edge portion around its entire periphery with the lower edges of said side walls.

20. The crustacean trap according to claim 19, wherein said top and side walls are primarily constructed of synthetic resin.

* * * * *